Patented Jan. 22, 1952

2,583,415

UNITED STATES PATENT OFFICE 2,583,415

LOWER ALKYL ESTERS OF FLUORINATED PROPIONIC ACID AND A METHOD OF MAKING THE ESTERS

David W. Chaney, Nether Providence Township, Delaware County, Pa., assignor to American Viscose Corporation, Wilmington, Del., a corporation of Delaware No Drawing. Original application June 28, 1946, Serial 680,055. Divided and this application June 4, 1948, Serial No. 31,204

6 Claims. (Cl. 260—487)

This invention relates to alkyl esters of fluorinated propionic acids of the formula CF$_2$XCClXCOOR in which X is selected from the group consisting of fluorine and chlorine, and R is an alkyl group containing from 1 to 4 carbons.

The present application is a division of my pending application, Serial No. 680,055, filed June 28, 1946, now Patent No. 2,456,768.

The new fluorinated esters are obtained by reaction of the selected alcohol with fluorinated propionyl chlorides or fluorides obtained by the oxidation of correspondingly fluorinated propylenes. The propylenes are oxidized by passing a stream of oxygen, preferably mixed with at least a small amount of chlorine gas which serves as a catalyst for the reaction, into a vessel containing the fluorinated propylene and equipped with suitable stirring means and a source of internal actinic radiation, such as a mercury vapor lamp encased in a quartz tube extending into the vessel. The gas is passed in until the acyl halide is formed, as indicated by a marked decrease in the gas absorption rate, and varying from 50 hours to about 120 hours depending upon the propylene being oxidized and other conditions such as the efficiency of stirring, the concentration of chlorine and the intensity of the radiation.

The temperature at which the oxidation is conducted may vary somewhat, depending upon the boiling point of the propylene being oxidized and the solubilities of the gases therein, which decrease with increasing temperature, but is preferably maintained within the range of from about 30° to 80° C., the reaction vessel being externally cooled to dissipate the heat of the actinic radiation source.

The reaction of oxygen with the propylene of the type under consideration apparently results in the formation of an intermediate oxide of the general formula

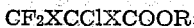

where X has the same significance as above, which by rearrangement involving a shift of a halogen atom from one carbon to another, is converted to the corresponding acyl halide. Most unexpectedly, this shift of a halogen atom and rearrangement to form the acid halide takes place, in the case of the propylenes under consideration, not only with respect to chlorine, but under the conditions described herein, with respect to the perhalogenated methyl group. Thus, when 1,1,3-trichloro-2,3,3-trifluoropropene-1 (CF$_2$ClCF=CCl$_2$) is oxidized, the oxidation product comprises both the acid chloride (CF$_2$ClCFClCOCl)

and the acid fluoride (CF$_2$ClCCl$_2$COF), the former due to a shift of a chlorine atom, the latter due to a shift of CF$_2$Cl, the rearrangement taking place according to the following scheme:

First step—oxidation—

Second step—rearrangement—
(1) Shift of chlorine:

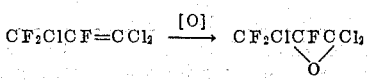

(2) Shift of substituted methyl group:

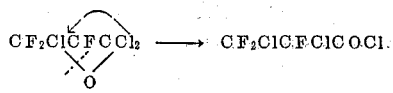

The oxide or mixture of oxides present in the reaction product may be converted to the acyl chloride or mixture of acyl chloride and acyl fluoride by treatment with an amine such as pyridine or, in the case of non-fluorine containing compounds, by treatment with Friedel-Crafts type salts.

The fluorinated esters, which are useful as intermediates in various chemical processes, as solvents, etc., may be produced by treating the oxidation product of the propylene comprising the acyl halide with the alcohol without isolation of the halide, or the acyl halide may be isolated from the oxidation product and then reacted with the alcohol.

The following examples in which the parts are by weight will serve to illustrate the invention.

*Example I*

The apparatus used was a three-neck flask equipped with a stirring device, thermometer, gas inlet, reflux condenser, and a source of internal actinic radiation comprising an 80 watt mercury vapor lamp encased in a quartz tube extending into the flask. About 2,785 parts of 1,1,2,3-tetrachloro-3,3-difluoro-propene-1, (CF$_2$ClCCl=CCl$_2$), were placed in the flask and a mixture of oxygen and chlorine in a 10:1 ratio was passed into the flask with constant stirring of the flask contents.

The temperature was held at 45–60° C., the flask being cooled by means of running water. At the start, the gases were absorbed at a rate of 50 ml./min. After about 20 hours, the absorption rate had dropped to about 10 ml./min. and the reaction was terminated.

The reaction liquid comprises primarily α-dichloro-β-difluoro-chloropropionyl chloride, $$CF_2ClCCl_2COCl$$

and an oxide believed to be

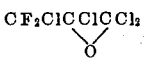

The acid chloride was converted to the ethyl ester by adding the reaction mixture to about 1600 parts of absolute alcohol, with cooling and stirring, the temperature being maintained at about 30° C. The mixture was allowed to stand for about one hour and then poured into 4,000 parts of water. The products which separated as an oil were washed with dilute sodium bicarbonate, then with water, and after drying over sodium sulfate, were fractionally distilled. About 1,670 parts of the ethyl ester of α-dichloro-β-difluoro-chloropropionic acid were obtained, B. P. 170–174° C., $N^{24°} = 1.425$.

Example II

In an apparatus as described in Example I, 4730 parts of 1,1,3-trichloro-2,3,3-trifluoropropene-1 ($CF_2ClCF=CCl_2$) were photo-oxidized as described in Example I to a mixture consisting primarily of α-chlorofluoro-β-difluorochloropropionyl chloride ($CF_2ClCFClCOCl$), α-dichloro-β-difluorochloropropionyl fluoride $$(CF_2ClCCl_2COF)$$

and an oxide believed to be

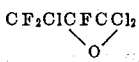

The reaction mixture also comprised some unoxidized starting material, some chlorinated product, and by-products resulting from more complete oxidation and degradation, including $COCl_2$, $CO$, and $CF_2ClCOCl$. The temperature during the reaction was maintained at about 35° C. The 10 to 1 mixture of gaseous oxygen and chlorine gas was absorbed at the rate of 300 ml./min. When the absorption rate dropped to about 50 ml./min, which required about 30 hours, the reaction was terminated.

The contents of the flask were then slowly heated to about 50° C. to remove dissolved chlorine gas and low-boiling by-products.

The acid halides were converted to the corresponding acid esters in the manner described in Example I, that is by adding the crude reaction liquid to absolute ethanol. After fractional distillation, the pure esters were obtained. The ethyl ester of α-chlorofluoro-β-difluorochloro-propionic acid had a boiling point of 142° C., refractive index $N_D^{23°}$ 1.3830, and $d^{23°}$ 1.405. The ethyl ester of α-dichloro-β-difluorochloropropionic acid had a boiling point of about 172.5° C., refractive index $N_D^{23°}$ 1.4188 and $d^{23°}$ 1.460.

Instead of ethyl esters, other esters may be obtained by reacting the propionyl halide with the appropriate alcohol, such as methanol, butanol, propanol, etc.

I claim:
1. An ester of a fluorinated propionic acid of the general formula

$$CF_2XCClXCOOR$$

where X is selected from the group consisting of fluorine and chlorine, and R is an alkyl radical containing from 1 to 4 carbons.

2. The ethyl ester of alpha,alpha-dichloro-beta,beta-difluoro-beta-chloropropionic acid.

3. The ethyl ester of alpha-chloro,alpha-fluoro-beta,beta-difluoro - beta - chloropropionic acid.

4. Method of making esters of fluorinated propionic acids having the general formula $$CF_2XCClXCOOR$$

where X is selected from the group consisting of fluorine and chlorine, and R is an alkyl radical containing from 1 to 4 carbons, which comprises treating a fluorinated propylene of formula $$CF_2XCX=CCl_2$$

with oxygen mixed with chlorine gas, under the influence of actinic radiation and reacting the acyl halide thus obtained with a lower aliphatic alcohol.

5. Method of producing the ethyl ester of alpha,alpha-dichloro - beta,beta - difluoro - beta-chloropropionic acid which comprises treating a fluorinated propylene of formula $$CF_2ClCCl=CCl_2$$

with oxygen mixed with chlorine gas, under the influence of actinic radiation and reacting the acyl chloride thus obtained with ethanol.

6. Method of producing a mixture comprising the ethyl ester of alpha-chloro,alpha-fluoro-beta,beta-difluoro - beta - chloropropionic acid which comprises treating a fluorinated propylene of the formula $$CF_2ClCF=CCl_2$$

with oxygen mixed with chlorine gas, under the influence of actinic radiation to produce a mixture of acid halides of the formulae $$CF_2ClCFClCOCl \text{ and } CF_2ClCCl_2COF$$

and reacting the mixed halides with ethanol.

DAVID W. CHANEY.

REFERENCES CITED

The following references are of record in the file of this patent:

UNITED STATES PATENTS

| Number    | Name         | Date          |
|-----------|--------------|---------------|
| 2,292,129 | Kirkbride    | Aug. 4, 1942  |
| 2,382,548 | D'Ianni      | Aug. 14, 1945 |
| 2,405,894 | Lichty       | Aug. 13, 1946 |
| 2,427,624 | Rushmer et al. | Sept. 16, 1947 |

OTHER REFERENCES

Fieser et al.: "Organic Chemistry," (D. C. Heath; Boston; 1944), pp. 186–187.